United States Patent [19]
Adachi

[11] Patent Number: 5,922,489
[45] Date of Patent: Jul. 13, 1999

[54] BATTERY HOLDER

[75] Inventor: Yoshio Adachi, Kodaira, Japan

[73] Assignee: AUE Co. Research Center, Tokyo, Japan

[21] Appl. No.: 08/882,528

[22] Filed: Jun. 25, 1997

[51] Int. Cl.⁶ .................................................. H01M 2/10
[52] U.S. Cl. .............................. 429/100; 429/96; 429/97
[58] Field of Search .............................. 429/96, 97, 98, 429/99, 100

[56] References Cited

U.S. PATENT DOCUMENTS

| | | | |
|---|---|---|---|
| 4,070,821 | 1/1978 | Somogyi | 58/23 |
| 4,107,400 | 8/1978 | Grohoski | 429/98 |
| 4,223,076 | 9/1980 | Terada | 429/96 |
| 4,405,698 | 9/1983 | Nagaura | 429/219 |
| 4,487,820 | 12/1984 | Engelstein et al. | 429/100 |
| 4,495,257 | 1/1985 | Engelstein et al. | 429/100 |
| 4,653,822 | 3/1987 | Kanazawa | 339/17 |
| 4,658,151 | 4/1987 | Wyser et al. | 307/66 |
| 4,692,846 | 9/1987 | Johnson | 362/104 |
| 4,842,966 | 6/1989 | Omori et al. | 429/100 |
| 4,891,282 | 1/1990 | Nagaura et al. | 429/194 |
| 4,925,754 | 5/1990 | Dunham | 429/245 |
| 4,992,987 | 2/1991 | Echols et al. | 365/229 |
| 5,009,971 | 4/1991 | Johnson et al. | 429/252 |
| 5,015,918 | 5/1991 | Copeland | 315/76 |
| 5,033,616 | 7/1991 | Wyser | 206/333 |
| 5,075,182 | 12/1991 | Weber | 429/1 |
| 5,077,572 | 12/1991 | Morisawa | 354/484 |
| 5,149,604 | 9/1992 | Nakanishi | 429/97 |
| 5,187,026 | 2/1993 | Scrivano | 429/96 |
| 5,187,746 | 2/1993 | Narisawa | 429/86 |
| 5,188,912 | 2/1993 | Katoh et al. | 429/96 |
| 5,312,269 | 5/1994 | Hwang | 439/500 |
| 5,316,873 | 5/1994 | Scrivano | 429/96 |
| 5,328,781 | 7/1994 | Mikake | 429/97 |
| 5,376,476 | 12/1994 | Eylon | 429/1 |
| 5,378,549 | 1/1995 | Eylon | 429/1 |
| 5,380,602 | 1/1995 | Kato et al. | 429/123 |
| 5,411,537 | 5/1995 | Munshi et al. | 607/33 |
| 5,411,538 | 5/1995 | Lin | 607/33 |
| 5,421,743 | 6/1995 | Hwang | 439/500 |
| 5,432,027 | 7/1995 | Tuttle et al. | 429/127 |

FOREIGN PATENT DOCUMENTS 340464  11/1992  Japan.

OTHER PUBLICATIONS

SBH, Inc.—Licensing Innovative Products, Letter to Tom Blaha, Apr. 1 1996.

Nolte, Nolte & Hunter, P.C., Letter to Memory Protection Device re patentability search for Coin Cell Battery, pp. 1–4.

*Primary Examiner*—Maria Nuzzolillo
*Assistant Examiner*—Mark Ruthkosky
*Attorney, Agent, or Firm*—Gottlieb, Rackman & Reisman, P.C.

[57] ABSTRACT

A battery holder which allows the battery to be installed or removed easily and accurately has a fulcrum that is convex upward formed near the center portion of the bottom surface of the battery holder base. A battery mounting frame has a retainer to immobilize one side of the battery and a frame that secures an electrode and the battery has a retainer and a removing flange to immobilize the other side of the battery. To install the battery, one side of the battery is forced against the spring force of the negative contact while the other side of the battery is inserted between the bottom surface and the retainer. The battery rotates around the fulcrum and is installed in the battery container by a single touch of a finger. As the removing flange is pressed, the installed battery rotates around the fulcrum to allow one side of the battery to escape from the battery container, and ride over the retainer toward the upper side, to allow the battery to be lifted out.

9 Claims, 6 Drawing Sheets

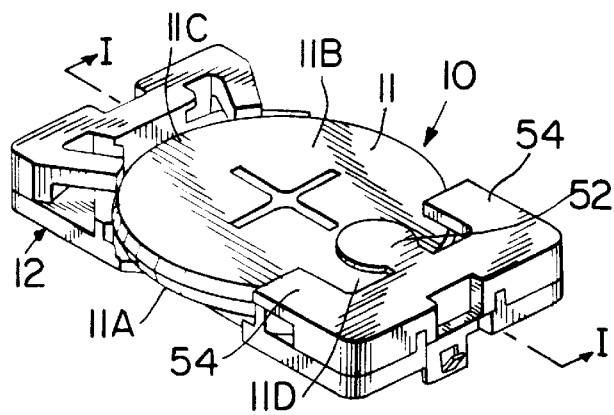
*FIG.1(A)*
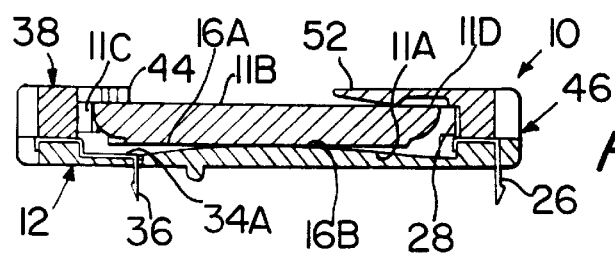
*FIG.1(B)*
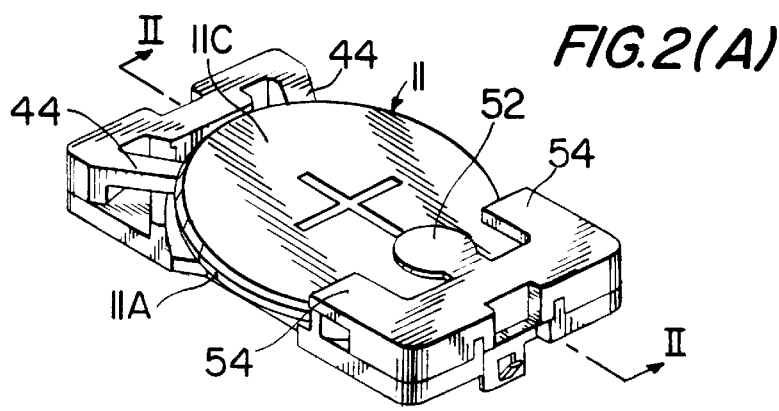
*FIG.2(A)*
*FIG.2(B)*
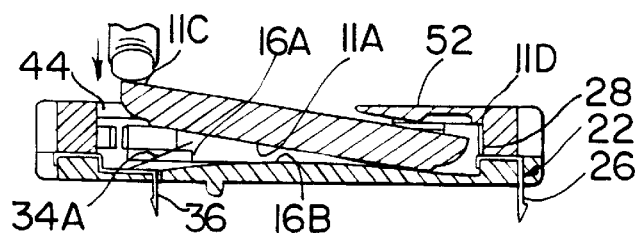

BATTERY HOLDER

FIELD OF THE INVENTION

This invention relates to a battery holder for a small dish-shaped battery, such as those used in video cameras for memory back up. In particular it relates to a configuration for such a battery holder that allows the battery to be popped in and out using a single finger. According to this invention, a battery holder that allows a small coin shaped backup battery to be installed or removed easily and accurately is provided.

BACKGROUND OF THE INVENTION

Japanese Patent HEI 3-40464(1991) discloses a battery holder for a dish-shaped battery. That battery holder has a main body with a plate that faces one surface of the dish-shaped battery and has an area that corresponds to the circumferential area of the battery. The other surface of the battery is exposed. A notch is formed in a part of the circumferential area of the main body of this holder. A first terminal that has sufficient elasticity to force and press the battery circumference toward the direction of the notch is mounted on the side opposite to the notched area in the inside of the circumferential part.

A retainer provided near the first terminal and the notched part engages the otherwise exposed surface of the battery to prevent the battery from falling out of the holder. A second terminal in the main body of the holder forces and presses the battery contained in the main body of the holder against the retainer.

To install the battery in the battery holder, the battery is inserted from the notched side against the first terminal, elastically deforming the portion of the first terminal in contact with the battery toward the side of the inserting direction. In this state, the battery is forced into the main body of the holder against the elastic force of the second terminal. The circumference of the battery is thus forced against the inner surface in the circumferential part near the notched area of the main body of the holder by the elastic force exerted by the first terminal. At the same time the other surface of the battery is held by the retainer, to keep the battery in the battery holder.

When removing the battery, the notched part must be pushed from the side of the notched area firmly in the direction of the first terminal and the battery then must be removed by using a finger tip while maintaining this state. This separates a part of the battery from the retainer on the notched side, allowing the battery then to be removed by the users fingers. Thus, a laborious technique is required to remove the battery, and the battery cannot be removed from the battery holder by the single touch of a finger. Also, it is difficult to remove the battery, without applying an excessive force.

Furthermore, if one wants to install a new battery in the battery holder, the battery must be installed by pushing the battery from the notched side toward the first terminal and the battery must then be forced and pressed into the main body of the holder against the elastic force of the second terminal in this state. Thus, the operation is awkward, and the battery cannot be installed by a single touch of one's finger.

Many other examples are known of holders for batteries, including coin type batteries. Principal among these are the following: U.S. Pat. No. 4,070,821 discloses a spring that simultaneously retains two batteries in a watch while the watch back is in place. To remove the batteries it is necessary to remove the watch back and the spring. U.S. Pat. No. 4,107,400 discloses a button-type battery that is retained inside an opening by a hatch cover to which the battery is adhered by a non-permanent adhesive connection. A grip holds the battery for removal along with the hatch cover. U.S. Pat. No. 4,223,076 discloses a battery casing that has a lid that closes a battery chamber. The lid is directly mounted on the body of the battery casing. U.S. Pat. No. 4,495,257 discloses a battery holder for a cylinder cell having resilient contacts at its ends. Terminals project through its bottom for printed circuit board mounting, or flat terminals with eyelets project from the top of the holder. The holder comprises three parts: a casing, a positive terminal and a negative terminal. U.S. Pat. No. 4,653,822 discloses a battery that is stored in a chamber in which one contacting electrode provides sufficient contact force to retain the battery even in the absence of a bottom plate. The battery is inserted downwardly against the electrode and covered by a battery lid. U.S. Pat. No. 4,658,151 discloses a cup-shaped plastic housing for a long lived battery. The battery is placed in the housing and fixed in place by a casting resin resistant to the battery electrolyte. U.S. Pat. No. 4,992,987 discloses a battery package that has a battery contacted with a bar across its diameter that holds the battery in place. A sealing composition envelops the battery contacts. U.S. Pat. No. 5,075,182 discloses a flat battery installed in a holder by use of a battery handle that is attached to the battery and keyed to assure proper installation of the battery. U.S. Pat. No. 5,077,572 discloses a housing for a backup battery is formed within a chamber of a camera body adapted to receive the main power battery. The backup battery is held within the housing by pressure from an electric pole and a support wall. To eject the battery an ejecting lever is rotated, pushing the battery from the housing into the main battery chamber. U.S. Pat. No. 5,149,604 discloses a battery holder for two batteries that prevents them from being simultaneously removed, which would risk the loss of all memory contents. The batteries are retained in holes, covered with pressing plates that are held in place by screws. The configuration prevents the simultaneous removal of the screws necessary to remove both batteries in a single operation. U.S. Pat. Nos. 5,187,026 and 5,316,873 disclose a battery adapter for a disc shaped battery that has an outer shape and terminal location to allow the disc battery to fit devices calling for cylindrical batteries. To replace the disc battery it is necessary to open a door in the adapter, to pivot a connector away from the surface of the disc battery and to remove the battery from its resting location. U.S. Pat. No. 5,187,746 discloses a hearing aid battery provided in a water tight container that permits the entrance of air to the battery. The insertion of a battery requires placement of the battery in a cylindrical chamber after lifting a flap. A slide member further locks the combination. U.S. Pat. No. 5,188,912 discloses a battery holder that is inserted in a direction parallel to the electrode surfaces of the battery. The battery is slid into the holder which is in turn slid into a receiver for the holder that contains the terminals that contact the battery holders. To remove the battery, the holder is removed from the receiver and the battery extracted from the holder. U.S. Pat. No. 5,328,781 discloses a battery holder for two disc batteries which prevents the simultaneous removal of both. The batteries are inserted by being pressed downwards against an upward spring force. Cut sections of the holder are provided to assist in removal of the batteries, with a switch section that can cover a cut to prevent removal of the corresponding battery. A lock holds the switch in place.

It is an object of this invention to remove the above-described difficulties of the prior art and to provide a battery holder for coin cells (dish shaped batteries) that allows the battery to be installed and removed easily and precisely.

BRIEF DESCRIPTION OF THE PRESENT INVENTION

This invention achieves the objective of simplifying battery insertion and removal. The invention comprises a battery holder, having a holder base that is equipped with a first metal contact to make electrical contact with an edge of a dish-shaped battery. That edge is electrically continuous with the upper (usually positive) surface of the battery. Guides, which extend from near the circumferential edge of the contact form a boundary of a battery container in the interior of the holder. A (usually negative) electrode contacts the lower surface of the battery at a side opposite the edge contacted by the metal contact. The (positive) metal contact is mounted on the holder base and has enough elasticity to force the battery, when contained in the battery container, toward one side of the holder. The electrode that is mounted on the holder base has enough elasticity to force the battery, when contained in the battery container, toward the first terminal. The battery holder also has a fulcrum that contacts the lower surface of the battery as it is inserted, and causes the battery to enter at an angle so that the end of one side of the battery rides over the negative terminal to contact the positive terminal beyond the fulcrum. After the battery is inserted, forcing that end of the battery downwards causes the battery to move away from the negative contact and allows its removal.

This invention provides a battery holder, having a pair of terminals disposed at an appropriate distance from each other and an elastically deformable retainer which extends between the terminals pieces and can be used to push and press the battery contained in the battery container. This invention also provides a battery holder where the positive and negative terminals are part of an integral unit.

BRIEF DESCRIPTION OF THE DRAWINGS

FIG. 1(A) is a perspective view to illustrate the state under which the battery is installed in the battery holder.

FIG. 1(B) is a sectional view of FIG. 1(A), across the line I—I.

FIG. 2(A) is a perspective view to illustrate that the one side of a battery contained in the battery container.

FIG. 2(B) is a sectional view of FIG. 2, across the line II—II.

DETAILED DESCRIPTION OF PREFERRED EMBODIMENTS OF THE INVENTION

A preferred embodiment of this invention is explained in the following text, in conjunction with the accompanying drawings. The dish shaped battery 11, for which the present invention is intended, increases its diameter gradually from its rear surface 11A toward its front surface 11B as shown in FIGS. 1 and 2.

Figure 5:
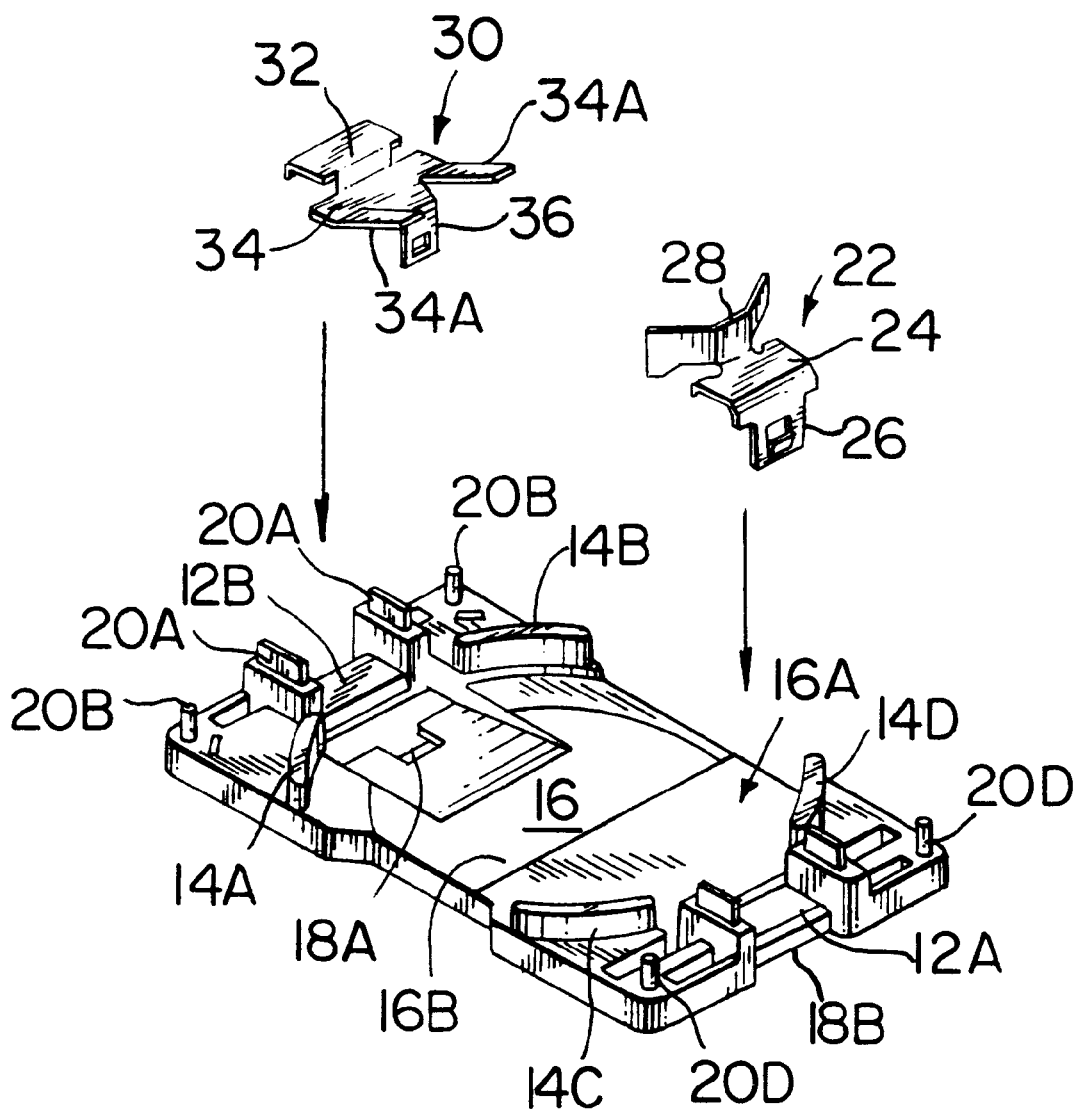
FIG. 5 is a perspective exploded view illustrating the electrodes mounted on the battery holder base.
Figure 6:
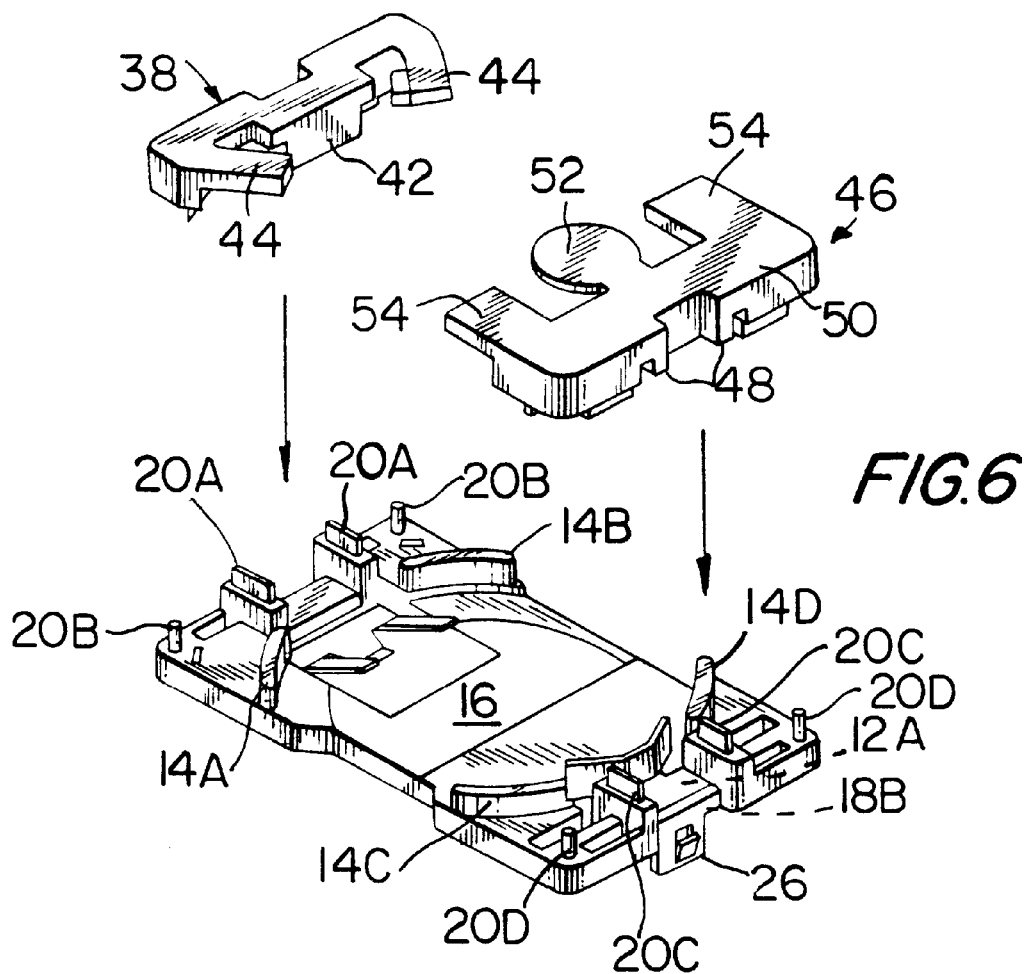
FIG. 6 is a perspective exploded view illustrating a battery mounting frame and an electrode immobilizing/battery immobilizing-removing frame mounted on the battery holder base to which an electrode is attached.

As illustrated in FIG. 1(A) and FIG. 1(B), the battery holder 10 comprises a base 12 which, as illustrated in FIG. 5 and FIG. 6, is a nearly rectangular plate. Arched guides 14A–14D (see FIG. 5) are provided at each of the four corners of the battery holder base 12. The surfaces that define a volume bounded at its corns by the guides 14A–14D, the upper surface of the base 12 at its bottom and an opening at its top comprise the battery container 16 in which the battery 11 reposes, as shown in FIG. 1(A).

Figure 8:
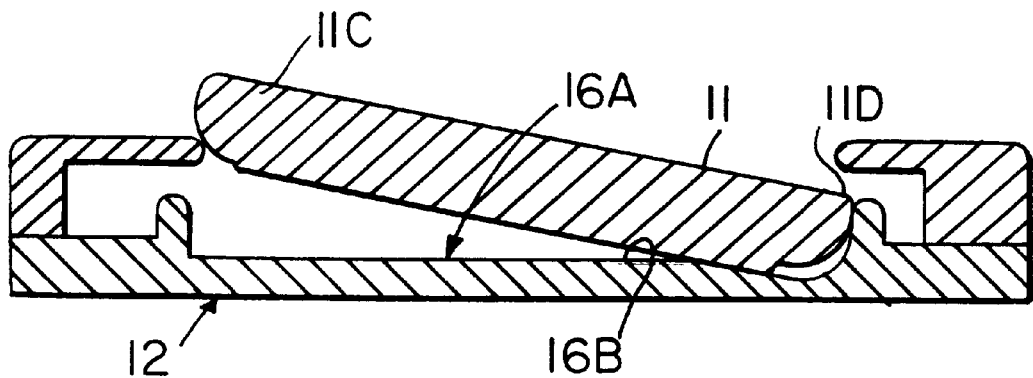
FIG. 8 is a sectional view illustrating the battery holder in accord with another embodiment of this invention.

The bottom surface 16A of the container 16 is curved upward to form a fulcrum 16B so that the bottom surface of the container rises toward the open side of the container, as illustrated in FIG. 1(A). The fulcrum 16B may be near the center portion of the container 16, so that it contacts a portion of the rear surface 11A of the battery 11 near its center. This fulcrum 16B may extend across the entire width of the container 16 perpendicular to the sides of the battery holder, as shown in FIG. 1(B), or more preferably the fulcrum may comprise a series of two or more ridges lying on the bottom surface as shown in FIG. 8 whose high points extend perpendicular to the sides of the battery holder. The fulcrum may also be located away from the center of the container and closer to one of the ends of the container.

As illustrated in FIG. 5, a mounting hole 18A between the guide 14A and guide 14B of the battery holder base 12 receives a negative electrode 30. At the other end of the battery holder base 12, the mount 18B, formed near the arched guides 14C and 14D, receives a positive electrode 22.

A pair of tenons 20A and mounting pins 20B illustrated in FIG. 6 are provided on the battery holder base 12 outside of the battery container 16 near the guides 14A, 14B. Another pair of tenons 20C and mounting pins 20D are provided on the battery holder base 12 outside of the battery container 16 near the guides 14C, 14D.

The positive electrode 22 comprises the positive mount 24 which is mounted at the groove 12A of the battery holder base 12. A positive terminal 26 descends from one end of the positive mount 24. The positive contact 28 rises at the other end of the positive mount 24. Both ends of positive contact 28 are bent as if to approach each other, as illustrated in FIG. 5. The positive contact 28 can undergo elastic deformation to allow both ends to approach each other or separate.

The positive electrode 22 is attached to the battery holder base 12 so that the positive terminal 26 contacts the concave mount 18B and the positive mount 24 contacts the groove 12A of the battery holder base 12, as illustrated in FIG. 6. When the battery 11 is inserted in the battery container 16, it will make electrical contact with the positive contact 28.

The elastic deformation of the positive contact 28 will press the battery 11 toward the guides 14A and 14B.

The negative electrode 30 comprises the negative mount 32 that contacts the battery holder base 12. The negative electrode 30 further comprises a pair of elastically deformable negative contacts 34A. The negative electrode 30 can be formed by having one end of the negative mount 32 extend downward and then bending forwards at an almost 90 degree angle to form an extended part 34, which is cut at both sides so that the negative terminal 36 can be bent to descend from between the negative contacts 34A.

The negative electrode 30 can be attached to the battery holder base 12 so that the negative terminal 36 is inserted through the mounting hole 18A and the negative extended part 34 contacts with the groove 12B of the battery holder base 12, as illustrated in FIG. 5. With this arrangement, as the battery is inserted in the battery container 16, the negative contact 34A contacts the rear surface 11A of the battery 11 (see, FIG. 1(B)), applying an elastic force to the bottom of the battery 11.

Figure 10:
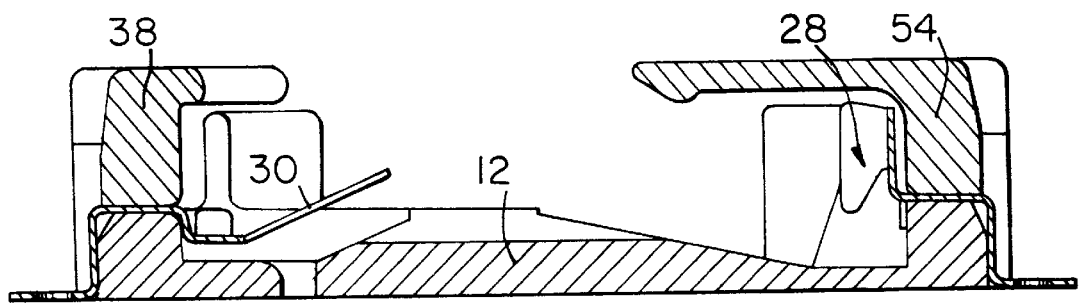
FIG. 10 is a side view of the invention showing an alternative placement of the terminals located at the extreme ends of the battery holder.
Figure 11:
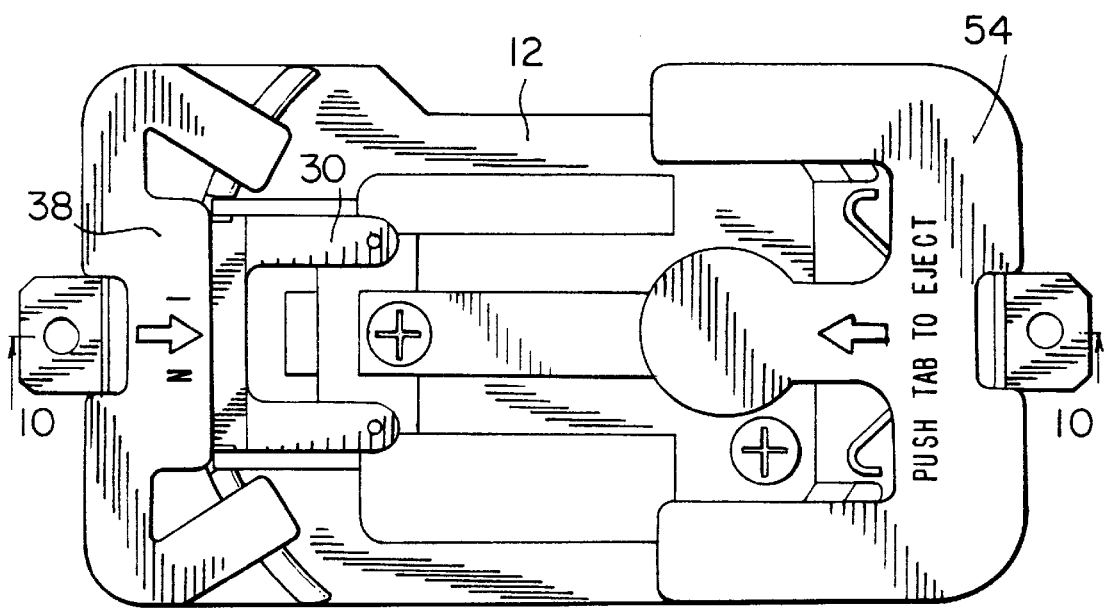
FIG. 11 is a top view showing the division of the fulcrum into a series of raised ridges extending across the base of the holder.

In another preferred embodiment, the negative terminal 36 is not led downwardly through the hole 18A in the base but is instead led through a hole a the rear of the base as shown in FIG. 10. This requires a different configuration for the negative electrode as shown in FIGS. 10.

As illustrated in FIG. 6, a frame 38 can be mounted on the battery holder base 12 to both immobilize the negative electrode and to retain the battery. The frame 38 comprises an electrode immobilizing part 42 and a pair of retainers 44 that extend from the ends of the electrode immobilizing part 42 to reach the side of the battery container 16. Each retainer extends so that its tip approaches the other retainer. When the battery is inserted into the battery container 16 it is forced past the retainers, which are resilient, so that the lower surface of each retainer 44 contacts the upper surface 11B of the battery 11 (See, FIG. 6(A)), to prevent the battery 11 from falling from the battery container 16.

Figure 7:
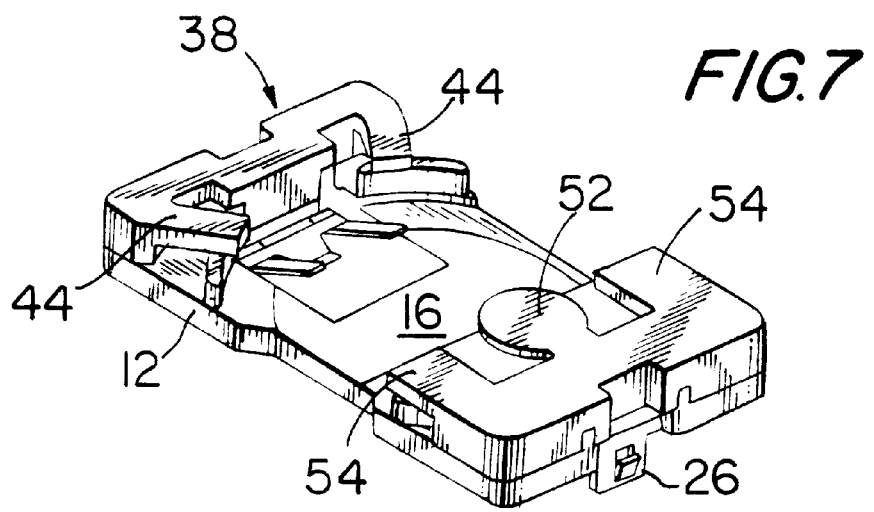
FIG. 7 is a perspective view of the battery holder base.

By inserting the tenons 20A into each of the pair of mortises (not illustrated) formed in the immobilizing part 42 of the frame and inserting the mounting pins 20B into each of the pair of mounting pin inserting holes (not illustrated) formed in the immobilizing part 42, the frame 38 can be joined to the battery holder base 12 to form an unit (See, FIG. 7).

The base 12 is connected to the retainers 44 and 54 and retains the electrodes 22 and 30. To facilitate assembly, these components may be connected by spot welding the platic retainers to the base. This may be done with or without other means to join the retainer, such as the tenons and mounting pins.

The frame 46, which immobilizes the positive electrode 22 and aids in retaining the battery, can also be mounted on the battery holder base 12. The frame 46 is almost in E-shaped (in a plan view), and it is equipped with a mounting base 50 on which a pair of notches 48 are formed.

At the middle portion in the longitudinal direction of the mounting base 50, a near dish-shaped elastically deformable removing flange 52 extends toward the battery mounting frame 38. At each of the ends of the mounting base 50, a retainer 54 extends toward the side of the battery mounting frame 38. By inserting the tenons 20C into the pair of notches 48 and inserting the mounting pins 20D into each of a pair of mounting pin inserting holes (not illustrated) formed in the mounting base 50, the frame 46 can be joined together with the battery holder base 12 to form a unit (See, FIG. 7).

If the battery 11 has the correct orientation, in other words if the battery is inserted in the battery container 16 so that the rear surface 11A of the battery 11 faces the bottom surface 16A of the battery container 16, the extent of protrusion of the retainer 44 toward the battery container 16 allows one side 11C of the battery 11 to be guided into the battery container 16. If the battery 11 has an incorrect orientation (the direction shown in FIGS. 4(A) and (B)), the retainer 44 will contact the surface 11B of the battery 11 to serve as a stop to prevent the battery 11 from being inserted in the battery container 16.

The battery holder 10 is configured in the above described manner. By inserting the positive terminal 26 and the negative terminal 36 into through-holes formed in a printed circuit substrate (not illustrated) and soldering it on printed wires formed on the rear surface of the printed circuit substrate, the battery holder 10 is mounted electrically and mechanically.

The procedure to mount or dismount the battery 11 into or from the battery holder 10 is explained in the following. To mount the battery 11 in the battery holder 10, one side 11C of the battery 11 is held by ones fingers, and the other side 11D of the battery 11 is inserted into the gap between the bottom surface 16A and the retainer 54 (FIGS. 2(A), (B)). In this inserted state, one side 11C of the battery 11 is located above the retainer 44, in such a way that the battery 11 is tilted against the battery holder 10.

In this tilted state, one side 11C of the battery 11 is pushed against the elastic force of the negative contact 34A. With such action, the battery 11 will move, with the fulcrum 16B as the supporting point, to cause one side 11C of the battery 11 to approach the bottom surface 16A and then ride over the retainer 44 in such a way that one side 11C of the battery 11 will be held by the bottom surface 16A and the retainer 44. At the same time, the other side 11D of the battery 11 moves and pushes the positive contact 28 of the positive electrode 22 toward the guides 14C, 14D against an elastic force and is held between the retainer 54 and the bottom surface 16A. Thus the battery 11 is inserted and held in the battery holder 10 (See, FIGS. 1(A), (B)). In this inserted state, one side 11C of the battery 11 is pushed toward the retainer 44 by the negative contact 34A and the circumferential surface of the one side 11C is pushed against the guides 14A, 14B by the positive contact 28. Therefore, the battery 11 is firmly installed in the battery container 16 and will not drop out of the battery container 16.

Because, in the present invention, the battery 11 can be installed in the battery holder 10 merely by pushing one side 11C of the battery 11 in one direction (with a single touch of a finger), the battery 11 can be inserted very easily. Unlike the conventional battery holder, installation of the battery 11 can be made precisely without failure because the battery 11 can be installed by merely pushing one side of the battery 11 in one direction wihtout a more complicated procedure such as pushing the battery 11 only in a first specified direction and then having to push it in a second direction while maintaining a pressed condition.

Figure 3:
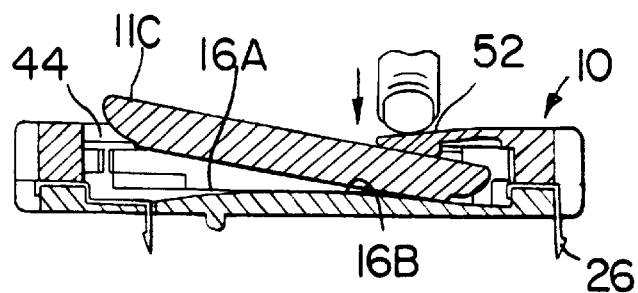
FIG. 3 is a sectional view depicting removing the battery installed in the battery holder.

To remove a battery 11 installed in the battery holder 10 from the battery container 16, it is merely necessary to press the removing flange 52, as illustrated in FIG. 3. With this maneuver, the battery 11 will move to separate one side 11C of the battery 11 from the bottom surface 16A by using the fulcrum 16B as the supporting point.

During this movement, the negative contact 34A will force one side 11C of the battery 11 toward the direction causing side 11C to emerge from the battery container 16, while the positive contact 28 will force the battery 11 toward the guides 14A, 14B. One side 11C of the battery 11 will become free of the retainer 44 thereby allowing the battery 11 to be removed from the battery container 16 (See, FIG. 3). As illustrated in FIG. 3 (the state in which no pressure is applied by the fingers to the battery 11), the battery 11 can be removed by ones fingers, which completes the battery removing procedure. Unlike the conventional battery holder, the battery can be taken out easily and accurately since there is no need to hold the battery and remove the battery while the battery is pushed in a certain specific direction.

Figure 4A:
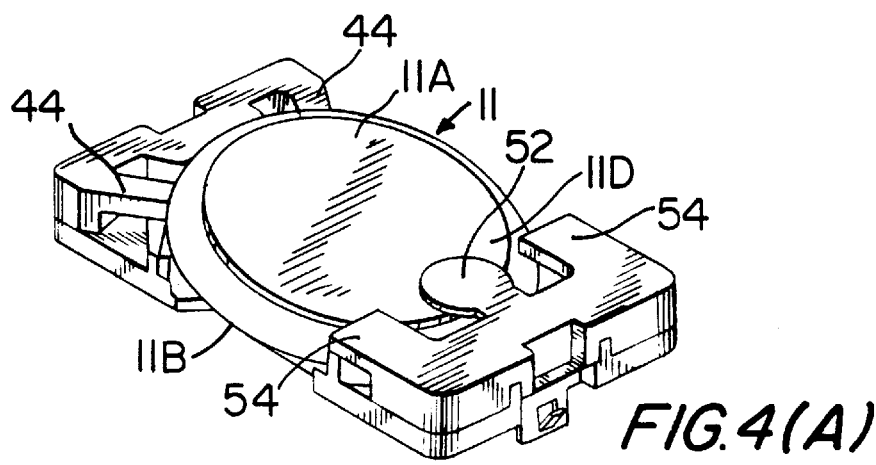
FIG. 4(A) is a perspective view to illustrate the situation under which the battery is going to be installed incorrectly in the battery holder.
Figure 4B:
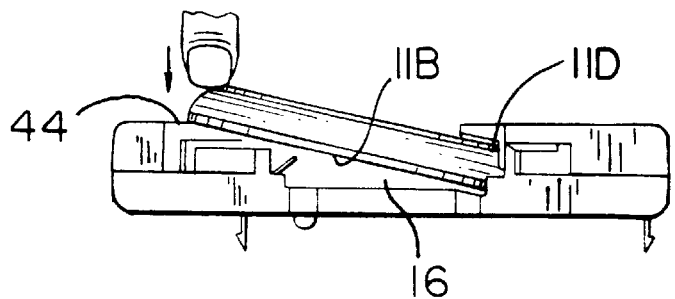
FIG. 4(B) is a sectional view of FIG. 4(A), across the line IV—IV.

Incidentally, as illustrated in FIGS. 4(A) and 4(B), if the battery 11 is incorrectly installed and the other side 11D of the battery 11 is inserted between the bottom surface 16A and the retainer 54, the retainer 44 will contact the surface 11B of the battery 11, which will prevent the battery 11 from being incorrectly installed in the battery container 16.

Even though it is preferred that a removing flange 52 be formed in the frame 46 and the battery 11 is removed by pushing this flange 52 in the preferred embodiment, such flange 52 may be omitted. In such case, to remove a battery 11 installed in the battery holder 10, it is necessary to press the area between the retainers 54 on the other side 11D of the battery 11.

Even though it is preferred that the fulcrum 16B be formed at the position which contacts the near center portion of the battery 11 (while the battery 11 is contained in the battery container 16) on the bottom surface 16A in the above-said embodiment, the fulcrum may be formed to contact the other side 11D rather than the near center portion of the battery 11 as illustrated in FIG. 8, for example. In this example also, because the battery will move as in the previous example around the fulcrum 16B during the installation and removal of the battery 11, the battery 11 can be installed or removed simply and accurately by a single touch of finger. Because the fulcrum 16B is formed at the position to contact the other side 11D rather than the near center portion of the battery 11 in this embodiment, the force required to install the battery 11 will be smaller, due to the principle of lever. On the other hand, in case of removing the battery 11, the force of the negative contact 34A (See, FIG. 5) will contribute part of the force to remove the battery 11, and therefore not cause a problem during the removal procedure.

The particular position of the fulcrum 16B is not critical, as long as it is located to contact with the rear surface 11A of the battery 11. However, because the battery 11 must be pushed down against the energizing force of the negative contact 34A to install the battery 11, it is more desirable to form the fulcrum at the position that contacts the other side 11D rather than at the center portion of the battery 11. Likewise fulcrums 16B may be formed over the entire direction perpendicular to the surface of the paper in FIG. 1(B), with only one fulcrum 16B formed in one locaton, or several fulcrums 16B may be formed at a certain spacing.

Figure 9:
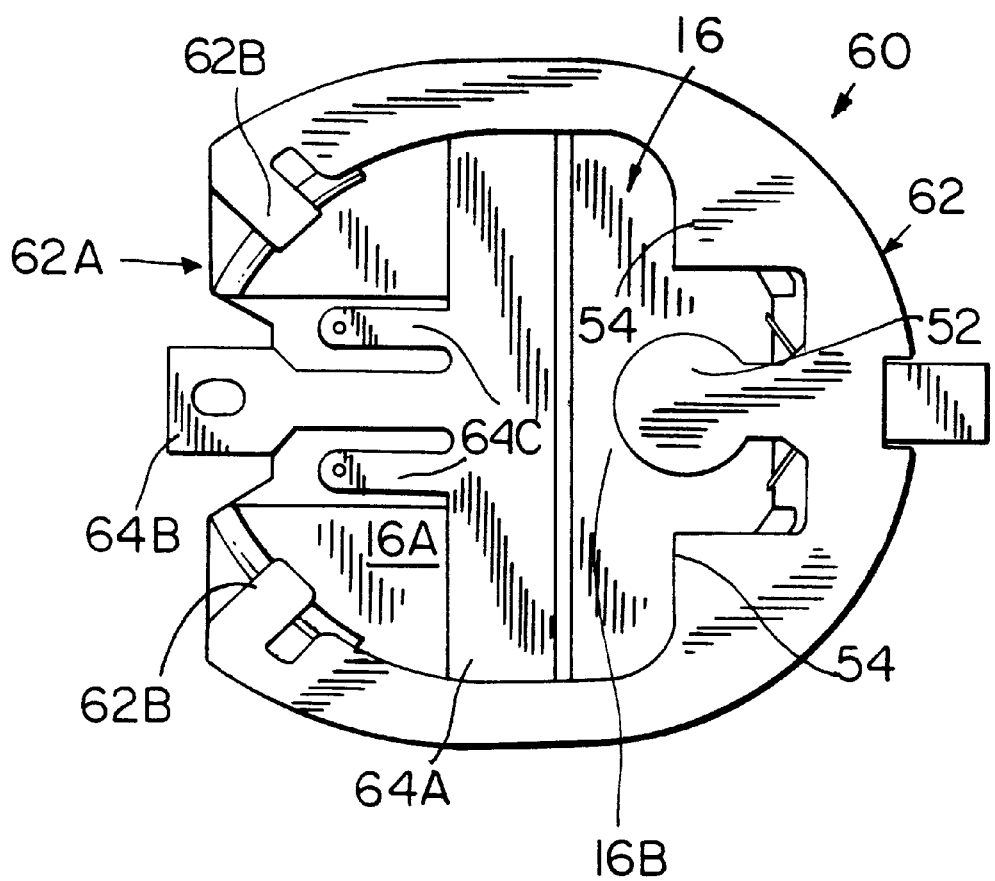
FIG. 9 is a plan view illustrating the battery holder in accord with another embodiment of this invention.

Although two material parts (frame 38 and electrode frame 46) are used to form the parts that hold the battery 11 in the battery container 16 in the above example, this may be formed by a single material part, as illustrated in FIG. 9. Because the configurations of the example of FIG. 9 and the previous examples are similar except for the parts that are employed to hold the battery in the battery container, the same reference numbers are used for their corresponding parts and further detailed explanation is omitted. Thus, in the battery holder 60 of this emboidment, the battery fastening material 62 to hold the battery 11 (See, FIG. 1(A)) in the battery container 16 is shaped almost like a ring that has a notched area 62A on the left side of FIG. 9, and near L-shaped retainers 62B are formed at each of the ends together forming a unit. As in the preceding embodiments, this retainer 62B has a size that allows one side 11C of the battery 11 to be guided toward the battery container 16 when the rear surface 11A of the battery 11 is inserted in the battery container 16 to face the bottom surface 16A as illustrated in FIGS. 2(A) and (B), and the retainer 62B can contact the surface 11B of the battery 11 to serve as a stop to prevent the battery 11 from being inserted in the battery container, as illustrated in FIGS. 4(A), (B), when the battery 11 is incorrectly installed. Incidentally, in this figure, 64 is the negative electrode. This negative electrode 64 is firmly attached to the battery holder base 12 via a flat plate 64A, and is equipped with a negative terminal 64B which extends from the mid portion of the flat plate 64A on the same plane, and a pair of negative contacts 64C extend from the flat plate 64A across this negative terminal 64B. The vicinity of the area 64A on the bottom surface 16A serves as the fulcrum 16B.

To install the battery 11 (See, FIG. 1(A)) into the battery holder 10 in this example, one side of the battery 11 is held up by fingers and the battery 11 is inserted into the battery container 16 via the notched area 64A, and the other side of the battery 11 is inserted between the bottom surface 16A and the mount 54. Subsequently, the notched area 64A side of the battery 11 is pushed by a finger. With this action, the battery 11 is installed in the battery container 16 by the same procedure as the preceding examples. In this example, as in the previous examples, the battery 11 can be installed in the battery holder 60 easily and accurately.

To remove the installed battery 11 from the battery container 16, the mount 52 is pressed. With this, the battery 11 moves, by employing the fulcrum 16B as the supporting point in the same manner as the previous embodiment, and the side of the battery 11 will reach above the retainer 62B, so that the battery 11 can be removed. Because a notched area 64A is formed in this example, the battery 11 can be removed smoothly and easily by inserting a finger in this space. Since the material holding the battery 11 in the battery container 16 is made of a one structure in the present example, the number of parts is reduced and the battery holder can be fabricated more easily.

Although the invention has been described in terms of particular embodiments the invention encompasses, in addition to those embodiments, such substitutions and additions that fall within the scope of the following claims.

What is claimed is:

1. A battery holder for a dish-shaped battery having a positive electrode edge and a negative electrode back comprising
   a holder base comprising
      a positive terminal to contact said positive electrode edge,
      a battery container in the interior of said holder base, said container being bounded by guides extending vertically and defining the circumferential edge of the container,
      a positive terminal positioned to contact one side of the upper surface of the battery at a first side of the battery,
      a negative terminal positioned to contact the lower surface of the battery at a second side thereof,
      said positive terminal adapted to exert an elastic force against the battery and towards said negative terminal, and said negative terminal adapted to exert an elastic force against the battery towards said positive terminal, a base comprising a fulcrum located between said positive and negative terminals, said fulcrum positioned to contact the lower surface of the battery, so that the first end of the battery will ride over the negative terminal during insertion to reach the positive contact when one side of the battery is forced toward the positive contact beyond the fulcrum.

2. The battery holder for a dish-shaped battery of claim 1, wherein said holder base further comprises means for attachment to first and second battery retainers, said first retainer contacting and holding in place said negative terminal and comprising paired resilient arms extending to contact and retain said first side of said battery, said second retainer contacting and holding in place said positive terminal and comprising a resilient retainer extending over a portion of said second side of said battery, wherein pressure downwards on said first side of said battery during insertion causes the battery to pivot on said fulcrum to be held by said first retainer and to contact said negative electrode, and wherein pressure downwards on said second side of said battery during removal of said battery causes the battery to pivot on said fulcrum so that said first side is freed from said first retainer.

3. The battery holder for a dish-shaped battery of claim 1, wherein said second retainer extends over said second side of the battery, wherein pressure on said second retainer exerts said pressure downwards on said second side of said battery.

4. The battery holder for a dish-shaped battery of claim 1 further comprising first and second battery retainers, said first retainer contacting and holding in place said negative terminal and comprising paired resilient arms extending to contact and retain said first side of said battery, said second retainer contacting and holding in place said positive terminal and comprising a resilient retainer extending over a portion of said second side of said battery, wherein pressure downwards on said first side of said battery during insertion causes the battery to pivot on said fulcrum to be held by said first retainer and to contact said negative electrode, and wherein pressure downwards on said second side of said battery during removal of said battery causes the battery to pivot on said fulcrum so that said first side is freed from said first retainer.

5. The battery holder for a dish-shaped battery of claim 1 wherein said fulcrum comprises a plurality of fulcrum segments located on the base of said holder.

6. The battery holder for a dish-shaped battery of claim 1 further comprising a battery retainer configured to prevent upside down insertion of the battery.

7. The battery holder for a dish-shaped battery of claim 6 further comprising a first battery retainer adapted to flex during insertion of a battery in a proper orientation and to snap to a position that holds the battery after insertion, said second retainer having insufficient flexibility to allow insertion of the battery in an inverted orientation.

8. The battery holder for a dish-shaped battery of claim 7 wherein said first battery retainer has flexible arms that flex during insertion of a battery in a proper orientation and obstruct insertion of the battery in an inverted orientation.

9. The battery holder of claim 2 wherein said means for attachment to first and second battery retainers comprises spot welded plastic surfaces.

* * * * *